United States Patent [19]
Fukuda et al.

[11] Patent Number: 5,294,785
[45] Date of Patent: Mar. 15, 1994

[54] CARDS PROCESSOR

[75] Inventors: Kazumi Fukuda; Hideo Urata; Koichi Kanehara, all of Kobe, Japan

[73] Assignee: Mitsubishi Jukogyo Kabushiki Kaisha, Tokyo, Japan

[21] Appl. No.: 752,362

[22] Filed: Sep. 3, 1991

[30] Foreign Application Priority Data

Aug. 31, 1990 [JP] Japan ................................ 2-228098
Jan. 31, 1991 [JP] Japan ................................ 3-029220

[51] Int. Cl.⁵ ........................ G06K 13/08; G07B 3/04
[52] U.S. Cl. ........................................ 235/477; 235/480
[58] Field of Search ................ 235/475, 477, 480; 271/184, 255

[56] References Cited

U.S. PATENT DOCUMENTS

| | | | |
|---|---|---|---|
| 3,755,653 | 8/1973 | Venker | 235/480 |
| 4,613,747 | 9/1986 | McCarthy | 235/477 |
| 4,619,197 | 10/1986 | Pailler | 101/93.04 |
| 4,772,781 | 9/1988 | Watanabe | 235/480 |
| 4,806,744 | 2/1989 | Briane et al. | 235/477 |

FOREIGN PATENT DOCUMENTS

| | | |
|---|---|---|
| 0169745 | 1/1986 | European Pat. Off. . |
| 0269121 | 6/1988 | European Pat. Off. . |
| 0288300 | 10/1988 | European Pat. Off. . |
| 0361110 | 4/1990 | European Pat. Off. . |

Primary Examiner—John S. Heyman
Attorney, Agent, or Firm—Jacobson, Price, Holman & Stern

[57] ABSTRACT

A cards processor (100) including a gateway (101) for the insertion and discharging of cards (104) on one end side of a cabinet (2), a transport line disposed in the cabinet (2) in almost a straight line from the gateway (101) for transporting the cards in a reciprocating manner in a transport direction, read/write devices (115, 116) for reading and writing information on the cards during transporting, and a standby portion (117) where the card transporting direction is reversed and for holding the cards in standby temporarily between operations.

3 Claims, 13 Drawing Sheets

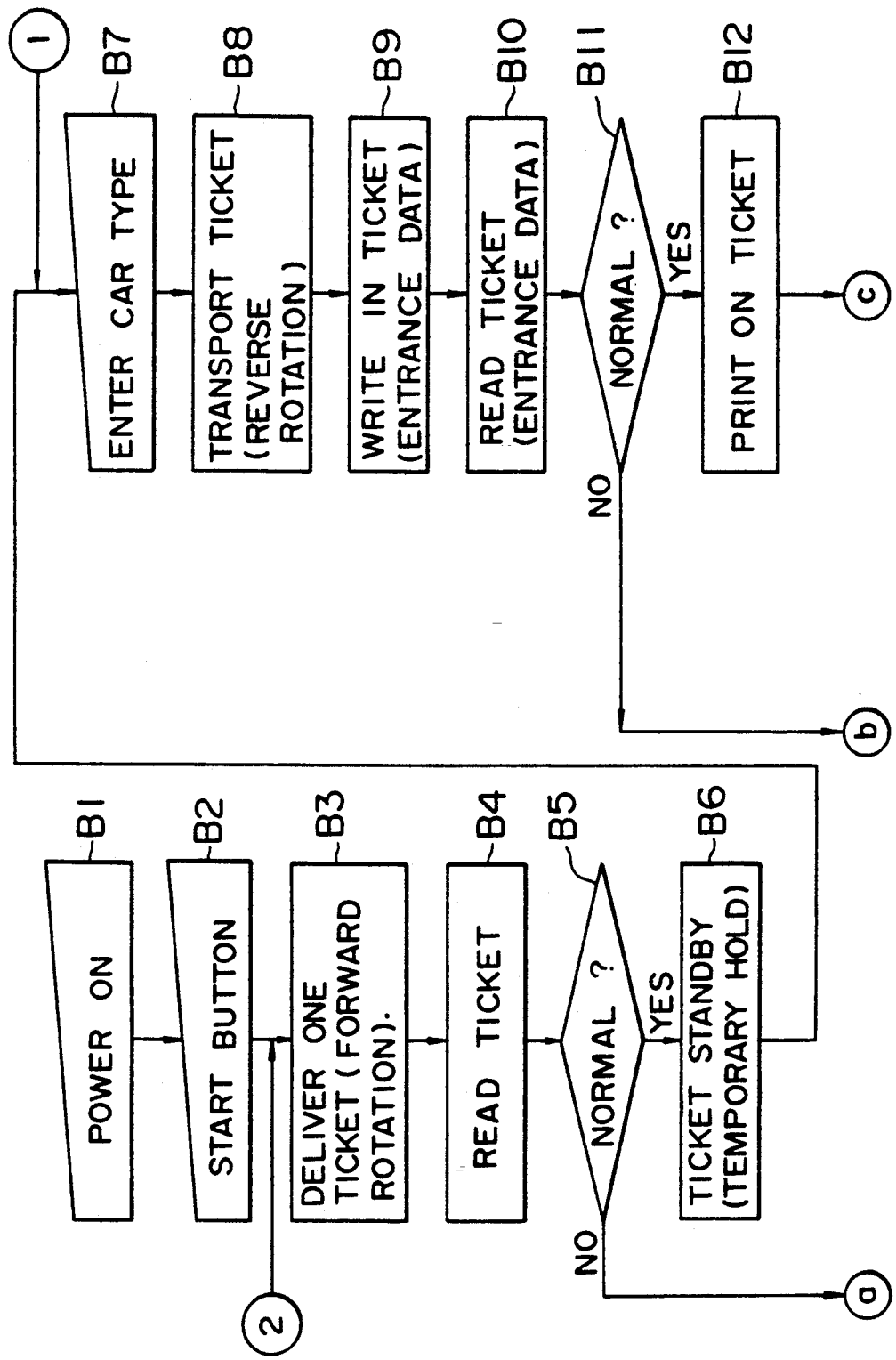
FIG. IIA

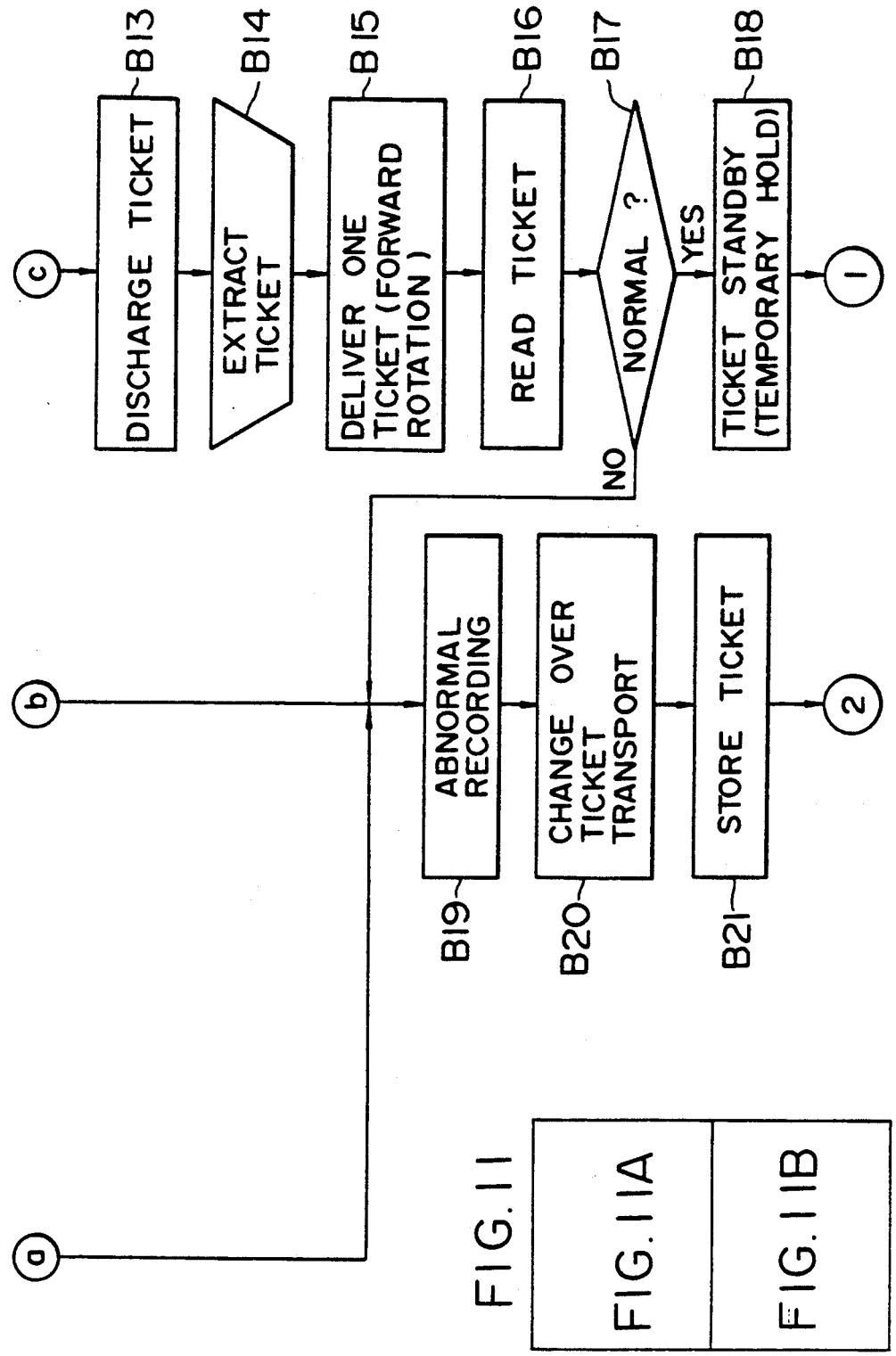

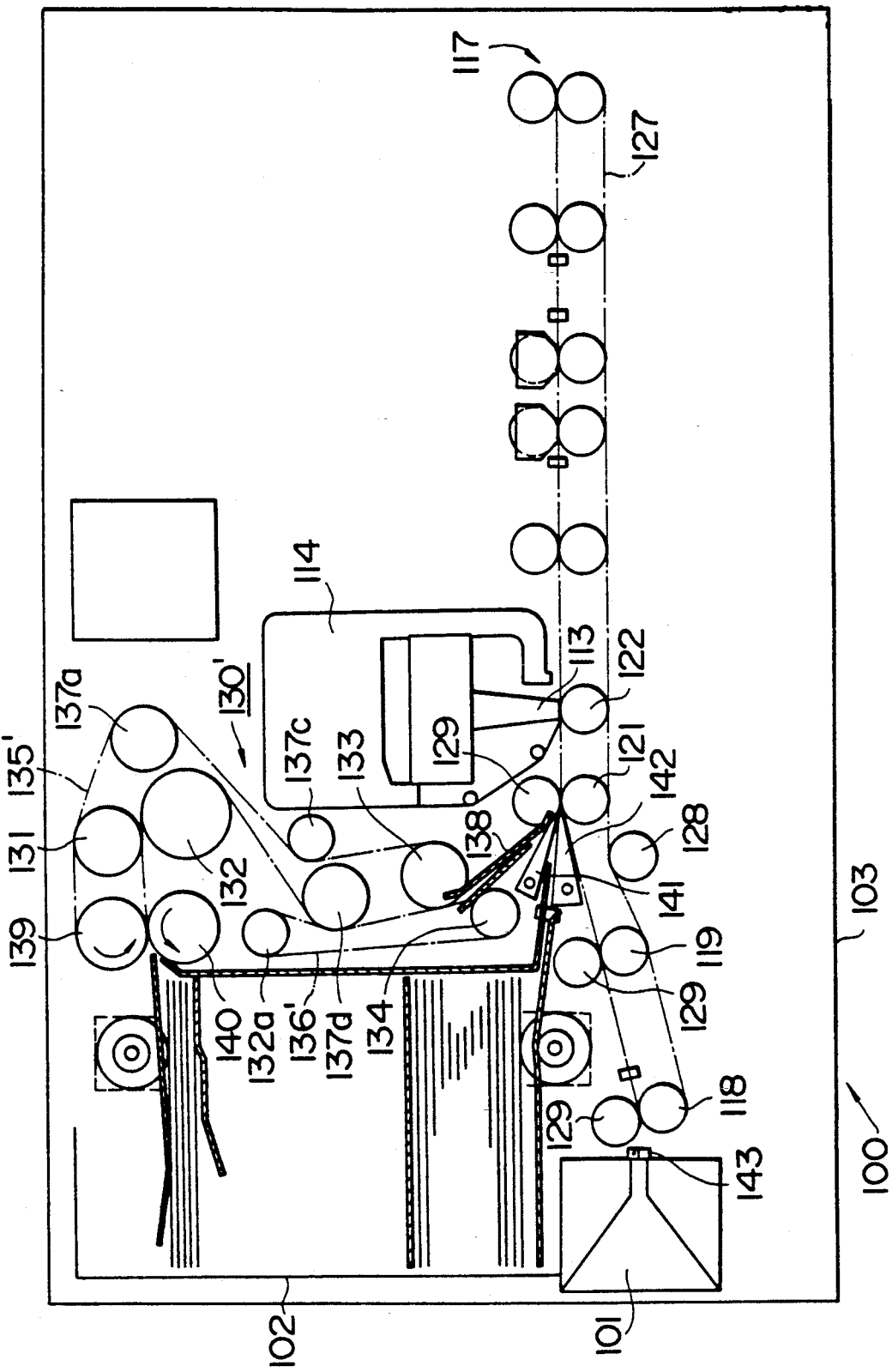

CARDS PROCESSOR

BACKGROUND OF THE INVENTION

The present invention relates to a cards processor for writing/reading a variety of information in and out of cards, and more particularly is suitable as terminal equipment for a toll receiving system in a toll road and the like.

In a long-distance toll road and the like having entrance gates and exit gates at a plurality of locations, a toll system whereby the toll in accordance with a utilization section and a utilized car type is collected is adopted. In such a toll receiving system a ticket in which the type of a car and the date and hour of utilization or information of the entrance gate and the like are recorded is issued and handed over to a user, and an operator collects the ticket from the user at the exit gate, reads information recorded in the ticket and liquidates the toll according to the utilization.

For this purpose, a cards processor for processing cards such as a credit card called a highway card and a separately paid plate which is a ticket or a prepaid card is installed at the entrance gate and the exit gate of above-described toll road and the like as a terminal equipment. A ticket utilizing a magnetic card constitutes the main usage today, but a ticket utilizing a punch card is also well known.

In an above-described conventional terminal equipment, a ticket processing portion 12, a display portion 13, a control portion 14 and a plate processing portion 15 are assembled in one main body 11 as shown in FIG. 14 which shows such equipment.

A ticket in case the toll is liquidated is fed into the ticket processing portion 12 through an inserting port 16 formed on the main body 11. On the other hand, when a ticket is newly issued, it is forwarded through a discharge port 17 from the ticket processing portion 12.

The control portion 14 is provided with an operation button 18 and a ten-key board 19 for inputting the car type and operation buttons 20 for special processing such as a free of charge certificate. In addition, a key plate inserting port for taking a plate such as a key plate and a separately paid plate in and out of the plate processing portion 15 is formed on the main body 11.

The above-described terminal equipment is used independently as a ticket vending machine at the entrance gate of a toll road, but the terminal equipment is jointly used with a receipt issuing machine 22, a cards processor 23 for a highway card and the like when it is used as a ticket identifying machine at the exit gate. The receipt issuing machine 22 is provided with an operation button 24 for issuing a receipt and a receipt issuing port 25, and the cards processor 23 is provided with a card gateway 26 for taking in and returning out a card.

A concrete structure of a conventional ticket processor 12 is disclosed in Japanese Patent Publication No. SHO62-9436 and others, but a ticket 27 is transported while being held with a drum 28 and an endless belt 29 for writing and reading various information in and out of the ticket 27 as illustrated in FIG. 15 showing a schematic construction and FIG. 16 showing a detail in cross section taken along A—A in the figure.

In such a structure, the drum 28 is driven to rotate continuously in a fixed direction (clockwise in FIG. 15) around a perpendicular shaft 30. At a part of the outer circumferential surface of the drum 28, the endless belt 29 stretched on four pulleys 31 to 34 is wound, and the endless belt 29 also rotates with the rotation of the drum 28. The pulley 31 facing on the inserting port 16 of the ticket 27 is pressed with a pinch roller 35. Thus, the ticket 27 is put between the drum 28 and the endless belt 29 and fed clockwise in the figure by pushing the ticket 27 between the pulley 31 and the pinch roller 35.

A hopper stacker 36 of the ticket 27 is arranged on one side of the drum 28, and this hopper stacker 36 functions principally as a stacker when the terminal equipment is used as a ticket identifying machine. On the other hand, the hopper stacker 36 functions principally as a hopper when it is used as a ticket vending machine. On the side of the hopper stacker 36 on the inserting port 16 side, a delivery roller 37 for delivering new tickets 27 stored in this hopper stacker 36 one by one is provided, and a guide roller 38 which feeds the ticket 27 delivered from the hopper stacker 36 between the drum 28 and the endless belt 29 is installed between the delivery roller 37 and the drum 28.

Further, a change-over lapper 39 which changes over feeding of the ticket 27 either to the hopper stacker 36 side or the discharge port 17 side is provided between the drum 28 and the endless belt 29 on the discharge port 17 side oscillatably. That is to say, when the equipment is used as a ticket identifying machine, the change-over flapper 39 is rotated clockwise in FIG. 15, and the ticket 27 is fed between the drum 28 and the endless belt 29 is guided to the hopper stacker 36 side, and on the other hand, when the equipment is used as a ticket vending machine the change-over flapper 39 is rotated counterclockwise in FIG. 15, and the ticket 27 fed from between the drum 28 and the endless belt 29 is fed between a pulley 34 facing on the discharge port 17 side and a pinch roller 40 energized by the pulley 34, thus issuing the ticket 27 from the discharge port 17.

A first reproducing head 41, a recording head 42, a second reproducing head 43 and a print head 44 in order from the inserting port 16 side around the drum 28. Thus, various information recorded in the ticket 27 is read by means of the reproducing heads 41 and 43, necessary information is recorded in the ticket 27 by means of the recording head 42, and necessary information is printed on the ticket 27 by means of the print head 44.

Also, since printing positions of the print head 44 on the ticket 27 shift up and down at the time of issuing a ticket and at the time of withdrawal in FIG. 16, the print head 44 is made movable in a direction parallel with a shaft 30. Further, numeral 45 in FIG. 16 indicates an optical sensor which detects passage of the ticket 27.

When it is intended to process a credit card and the like along with the ticket 27 simultaneously at an exit gate and the like in a conventional cards processor illustrated in FIG. 14 thru FIG. 16, it is required to write data from the credit card and the like on the ticket 27 beforehand.

However, as shown in FIG. 15 and FIG. 16, the ticket 27 is withdrawn into the hopper stacker 36 of the ticket processing portion 12 and it becomes impossible to write information of the credit card and the like in the ticket 27 unless the credit card is processed prior to processing of the ticket 27 in a conventional ticket processing machine.

That is to say, in a conventional ticket processing machine, when the ticket 27 is sent into the inserting port 16, the ticket 27 is withdrawn into the hopper stacker 36 after completing processing instantly because the drum 28 is always rotating. As a result, as steps of operation procedure, it is required to process the ticket 27 with the ticket processing machine beforehand after processing cards other than the ticket such as a credit card with the card processing machine 23, thus causing problems is operation that take time and so on in addition to troublesome operation.

BRIEF SUMMARY OF THE INVENTION

It is an object of the present invention to provide a cards processor which is capable of performing a plurality of processings easily in a short period of time by adding a temporary standby function of cards.

In order to achieve the above-described object, a cards processor according to the present invention comprises a gateway formed on one end side of a cabinet and through which cards are put in and issued out, a standby portion formed on another end side of the cabinet for having the cards stand by temporarily, a hopper stacker formed on one end side of the cabinet for storing the cards, transport means provided in the cabinet for moving the cards reciprocatingly along a transport line connecting the standby portion with the gateway, reproducing/recording means disposed halfway on the transport line for performing read/write of information for the cards, a change-over flapper provided halfway on the transport line between the reproducing/recording means and the gateway for guiding the cards transported from the standby portion either to the gateway side or to the hopper stacker side, and feed-out means for feeding the cards stored in the hopper stacker one by one halfway onto the transport line between the gateway and the reproducing/recording means.

In case a cards processor of the present invention is used as a ticket vending machine, when the cards stored in the hopper stacker are fed to the transport line side by the delivery means, these cards pass through the reproducing/recording means by the transport means and reach the standby position, and the cards stop at this standby position temporarily.

Thereafter, the transport means is operated again so as to feed the cards in a reverse direction to the gateway side. During transport, necessary information is read or recorded in the cards by the reproducing/recording means, and then these cards are discharged outside the cabinet through the gateway by means of the change-over flapper which guides the cards to the gateway side.

On the other hand, in case the cards processor is used as an identifying machine, when the cards are sent into the cabinet through the gateway, these cards are transported to the standby portion by the transport means and stand by there temporarily.

Thereafter, the transport means is operated again so as to feed out the cards in a reverse direction to the gateway side. During transport, necessary information is read or recorded out of or into the cards by the reproducing/recording means, and then these cards are withdrawn into the hopper stacker by the change-over flapper which leads the cards to the hopper stacker side.

According to a cards processor of the present invention, a transport line forming a straight line is set in a cabinet, and the cards are made to reciprocate along the transport line by transport means, and on the other hand, there are provided a gateway for the cards, a hopper stacker, a change-over flapper for changing over the transport direction of the cards either toward the gateway or toward the hopper stacker, a reproducing/recording unit for the cards and a standby portion for the cards in consecutive order from one end side of the transport line so as to perform other operations in a state that the cards are made to stand by at the standby portion. Thus, it becomes possible to process a plurality of operations without implication, thereby making it possible to look to simplification of operation and rapid processing.

Furthermore, in a cards processor according to the present invention, the transport means comprises a plurality of driving rollers disposed along the transport line, an endless belt wound over these driving rollers, a plurality of pinch rollers which are press-contacted with the outer circumferential surface of the belt and disposed at intervals shorter than the length of the cards, and transport guides disposed along the transport line on the sides of the belt and the pinch rollers for guiding one side edge of the cards, in which the pinch roller is fitted so that the shaft thereof may oscillate within a range of a fixed angle with respect to a line perpendicular to the transport direction of the card.

In a cards processor according to the present invention, the cards are put between a belt and pinch rollers and transported while being guided by transport guides. At that time, the pinch roller is tilted to a certain degree in the moving direction of the cards. As a result, in both cases of going and returning, the cards are applied with a force in a direction of the transport guide, and the side edge thereof is always pushed against the transport guide.

Thus, according to a cards processor of the present invention, it is possible to prevent a mistake in reading a magnetic record due to positional dislocation and to prevent a shear in printing since it is possible to maintain the relationship between the device for writing/reading the record such as a magnetic head and a print head and a position perpendicular to the transport direction of the card constant without depending on the reciprocal transport direction of the card. It is further possible to prevent a mistake in reading the record due to tilting and to prevent abnormal writing since the card is transported while the transport guide on one side and an end of the card are always pressed by a fixed force, and furthermore, dimensional adjustment between one side of the card and the guide becomes easier and lower working accuracy at the time of manufacturing than in a conventional method is applicable since only another side of the transport guide is used as the reference.

BRIEF DESCRIPTION OF THE DRAWINGS

The invention will now be described in detail with reference to the accompanying drawings wherein:

FIG. 1 thru FIG. 10, FIG. 12 and FIG. 13 show an embodiment in which a cards processor according to the present invention is applied to a ticket identifying machine which is terminal equipment of a toll receiving system in a toll road, and more particularly:

FIG. 1 is a perspective view of terminal equipment in the present embodiment;

FIG. 2 is a perspective view of a modified example of a terminal equipment in the present embodiment;

FIG. 3 is a schematic plan view showing a mechanism of a ticket processing portion conceptually;

FIG. 4 is a schematic cross sectional view taken along line B—B in FIG. 3;

FIG. 5 is a schematic perspective view showing an oscillating mechanism of a pinch roller of terminal equipment according to the present embodiment;

FIG. 7 is a plan schematic view showing a fitting structure of the pinch roller of terminal equipment according to the present embodiment;

FIG. 8 is a view taken along line C—C in FIG. 7;

FIG. 9 is a view taken along line D—D in FIG. 7;

FIG. 10 is a flow chart showing a processing procedure;

FIGS. 11A and 11B comprise a flow chart showing a processing procedure when the processor is used as a ticket vending machine;

FIG. 12 is a schematic plan view showing a modified example of a ticket feeding unit;

FIG. 13 is a schematic conceptual view of a mechanism showing a structure of a cards processing portion; in the present embodiment;

DETAILED DESCRIPTION OF PREFERRED EMBODIMENTS

Figure 1:
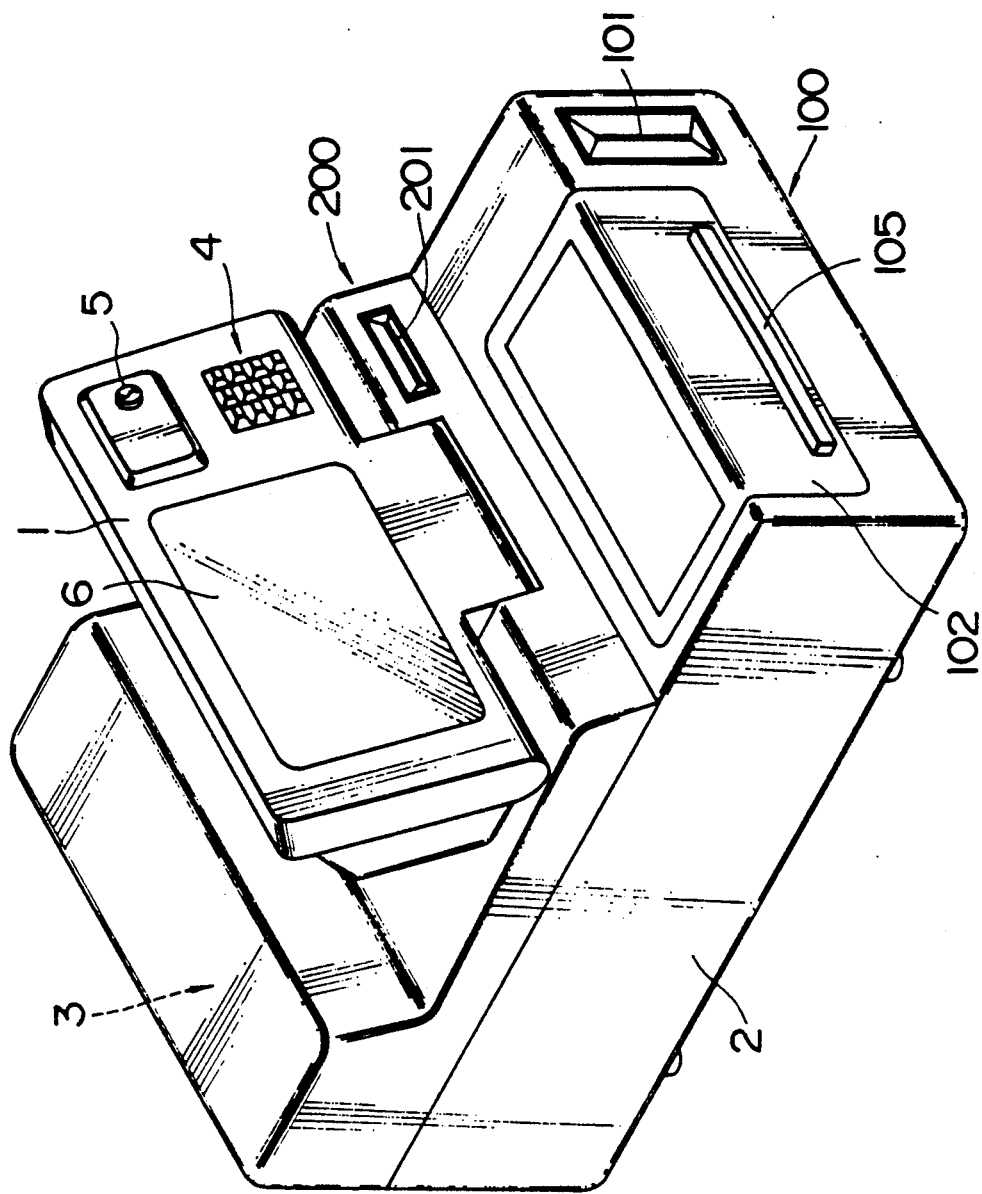

FIG. 1 shows the appearance of an embodiment in which a cards processor of the present invention is applied as a ticket identifying machine which is terminal equipment of a toll receiving system in a toll road. In the ticket identifying machine of the present embodiment, a folding type operation display portion 1 is pivoted rotatably on a cabinet main body 2. In the main body 2 of the ticket identifying machine, a ticket processing portion 100 with a gateway 101 for a ticket thereon, a card processing portion 200 with a gateway 201 for cards other than the ticket thereon, and a processing control portion 3.

On the operation display portion 1, a ten-key 4 and a key 5 for putting the power ON are provided, and a display panel 6 for special processing which is able to be inputted by touching is further provided. "Processing buttons" are displayed on the screen of the display panel 6, and necessary processing may be selected in an interactive manner by means of the displayed processing buttons. Further, a keyboard not shown having five operation buttons for inputting a car type and the like is mounted on a top surface of a hopper stacker 102 of the ticket processing portion 100 which will be described later.

Figure 2:
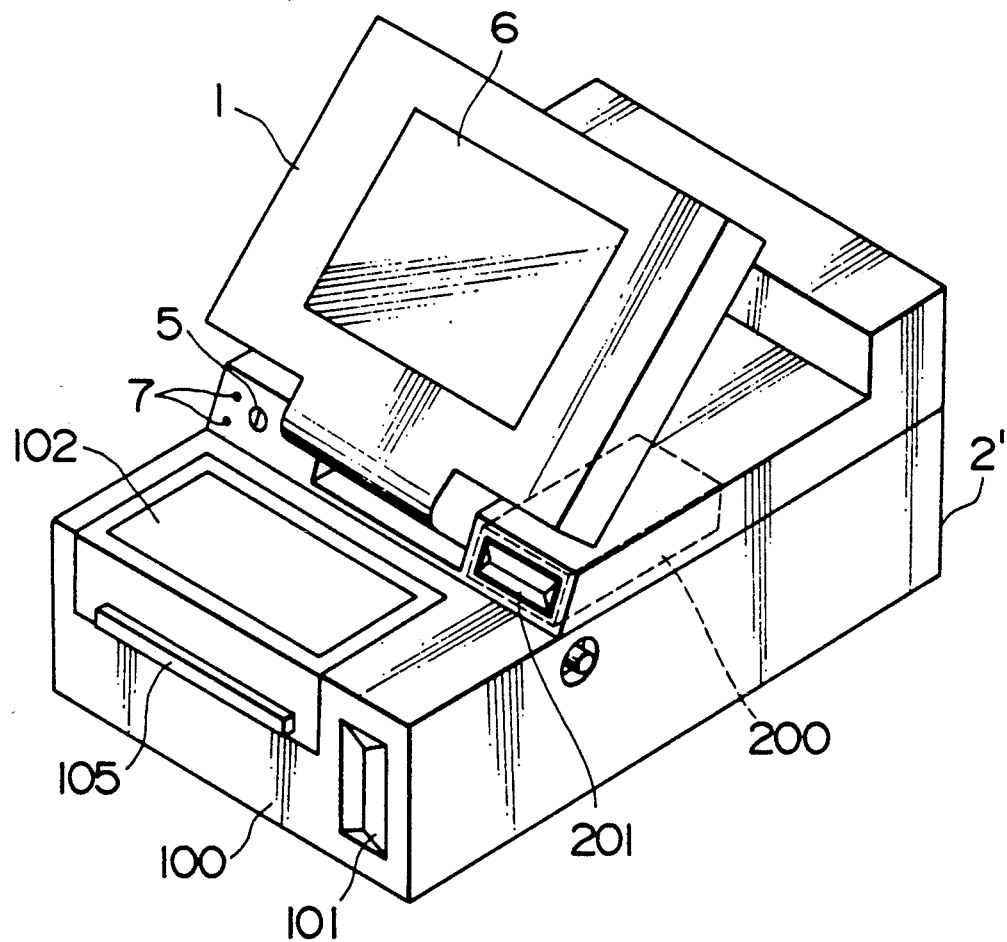

Further, FIG. 2 shows a modification of the main body 2 of the ticket identifying machine. Only the differences between the main body 2 and the main body 2' of this modification are in the positions of installing the key switch 5, in the existence of LEDs 7, red and green, showing opening and closing of a gate, and in the ten-key 4. The other elements are almost the same. In the main body 2' of the modification, the key switch 5 is disposed on the upper stage on the front of the main body 2', and the LEDs 7 are provided adjacent to the key switch 5. Further, the ten-key 4 is not provided in the main body 2'.

Figure 3:
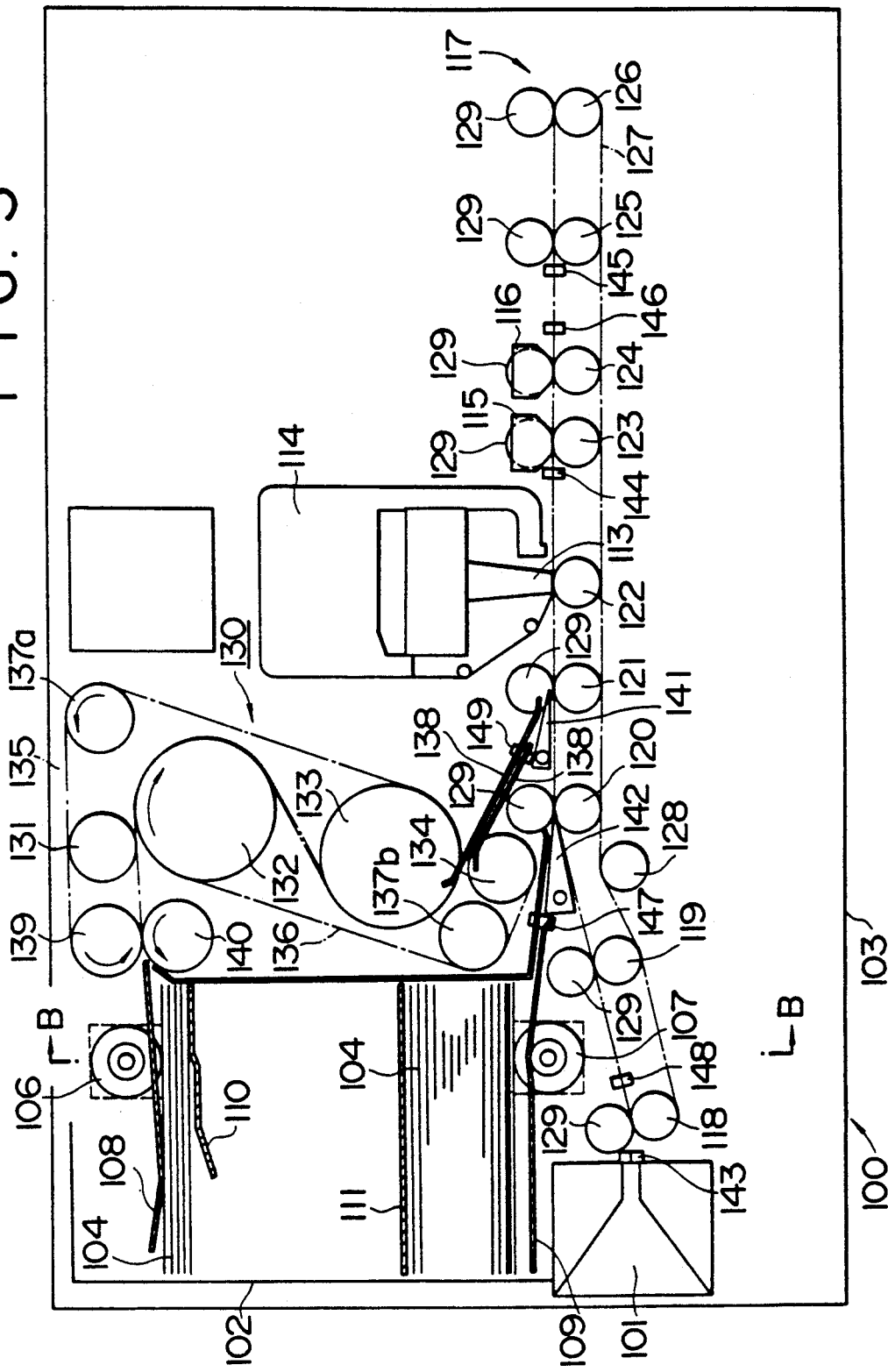
Figure 4:
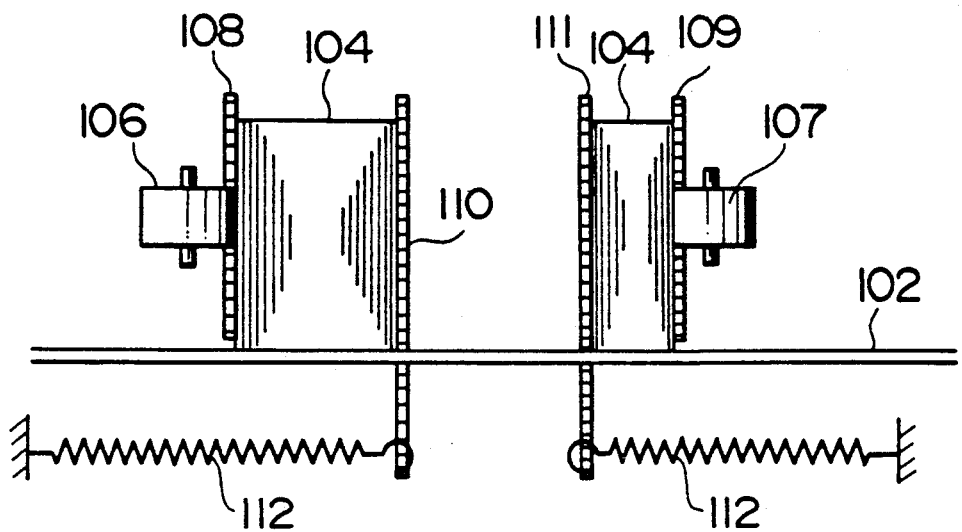
Figure 5:
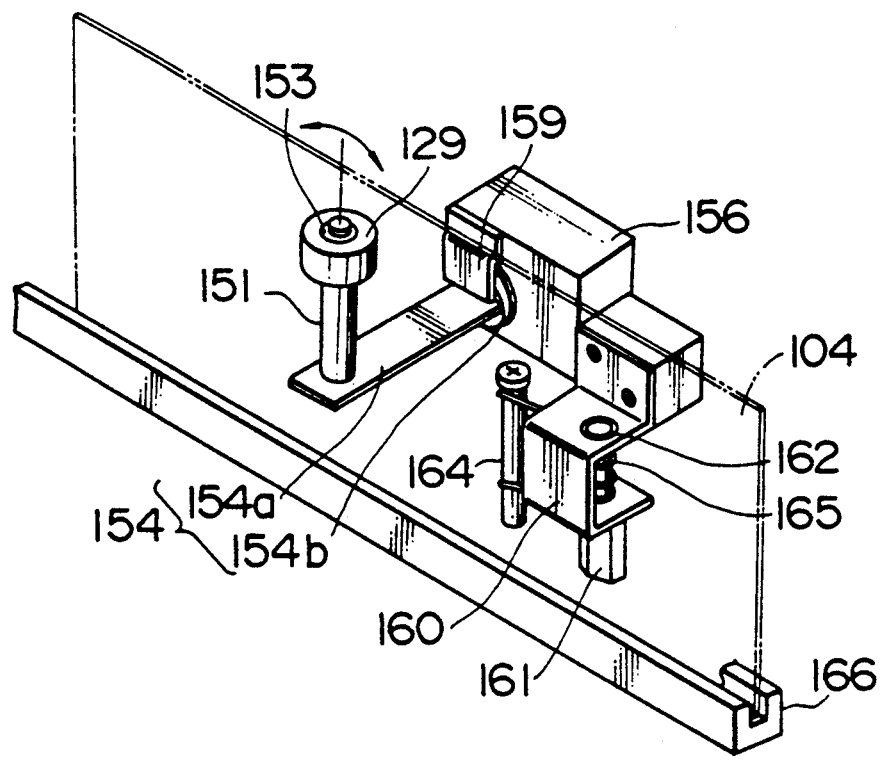

As illustrated in FIG. 3 showing a schematic plan view of the ticket processing portion 100 which constitutes a principal part of the present invention, and in FIG. 4 showing a cross sectional configuration thereof taken along line B—B in FIG. 3, the ticket processing portion 100 processes the ticket collectively, and can be used as it is as a ticket vending machine similarly to a conventional processing portion.

On the side (upper part in FIG. 3) of the gateway 101 formed at a front end of a cabinet 103, new tickets 104 are stored for reissuance in case a road user has lost the ticket, and a hopper stacker 102 for withdrawing defective tickets 104 among these new tickets 104, used tickets 104 and the like is fitted detachably to the main body 102 and the cabinet 103.

On both sides of the hopper stacker 102 provided with a handle 105, a delivery roller 106 for delivering new tickets 104 from the hopper stacker 102, and a lead-in roller 107 for leading off-specification tickets 104 among new tickets 104 and used tickets 104 into the hopper stacker 102 are fitted rotatably to the cabinet 103, respectively.

A pair of guide plates 108 and 109 crossing the delivery roller 106 and lead-in roller 107, respectively, are fixed to the hopper stacker 2. Further, a pair of presser plates 110 and 111 fitted to the hopper stacker 102 are disposed slidably in opposing directions between these guide plates 108 and 109, and respective presser plates 110 and 111 are energized in opposing directions to respective guide plates 108 and 109 through tension springs 112 as shown in FIG. 4.

Thus, a new ticket 104 inserted between the guide plate 108 and the presser plate 110 is energized toward delivery roller 106 side by the tension spring 112 through the presser plate 110, and a used ticket 104 and the like fed inbetween the guide plate 109 and the presser plate 110 is energized toward the lead-in roller 107 side by tension spring 112 through the presser plate 111.

In the rear of the above-described gateway 101 (right side in FIG. 3), a printer 114 provided with a print head 113 which prints characters, marks and the like onto the ticket 104, a reproducing head 115 for reading magnetic information in a magnetic recording portion not shown formed in the ticket 104 and a recording head 116 for writing new magnetic information in the ticket 104 are arranged in consecutive order. Further, a standby portion 117 which has the ticket 104 stand by temporarily is formed on the most rear end side of the ticket processing portion 100.

The present embodiment has been described as a ticket identifying machine, but the printing position on the ticket 104 by the print head 113 is different in case of the use as a ticket vending machine. Therefore, the print head 113 is constructed so that it is movable in the width direction of the ticket 104 or printing of a plurality of lines is possible.

The transport line for the ticket 104 is formed within the ticket processing portion 100 so as to connect the standby portion 117 with the gateway 101 through the print head 113, the reproducing head 115 and the recording head 116.

A plurality of driving rollers 118 to 126 which reciprocate the ticket 104 along the transport line are fitted rotatably to the cabinet 103 at an interval shorter than the length of the ticket 104.

Through actuation of a pulse motor capable of reciprocable rotation not shown, one piece of timing belt 127 is wound over these driving rollers 118 to 126 which rotates in a reciprocating manner, and slackness of the timing belt 127 is removed by a tension roller 128 interposed between the driving rollers 119 and 120. Further, pinch rollers 129 fitted rotatably with respect to the cabinet 103 across the transport line abut against driving rollers 118 to 121 and 123 to 126 except the driving roller 122 which is located opposedly to the print head 113.

As shown in FIG. 5 thru FIG. 9, the pinch roller 129 is supported rotatably through a bearing 152 and a snap ring 153 on one end side of a stationary shaft 151, and the stationary shaft 151 is set up so as to meet at right angles with a point end portion 154a of a plate form of an oscillating shaft 154. The oscillating shaft 154 is fixed with a nylon washer 157 and a snap ring 158 to an oscillating shaft fitting base 156 so as to be rotatable at a cylindrical base end portion 154b through a bearing 155. Further, an oscillation stopper plate 159 in a plate form a point end of which faces the vicinity of the surface on the base end portion 154b side of the point end portion 154a of the oscillating shaft 154, is attached fixedly to one end side of the oscillating shaft fitting base 156, thereby to regulate the rotatable range of the oscillating shaft 154 within a fixed range. On the other hand, a shaft fitting base 160 having a configuration of a plate crooked into a U-shape is fitted on another end side of the oscillating shaft fitting base 156, and the oscillating shaft fitting base 156 is fixed to a pinch roller fitting shaft 161 which penetrates through the shaft fitting base 160 through a snap ring 162 so as to be rotatable. The pinch roller fitting shaft 161 is set up on a transport base 163 so as to be provided in parallel with the stationary shaft 151 of the pinch roller 129, and the pinch roller 129 revolves with the pinch roller fitting shaft 161 as the center.

Further, a stopper 164 is set up in the vicinity of the pinch roller fitting shaft 161 of the transport base plate 163, and the pinch roller fitting shaft 161 in the shaft fitting base 160 is provided in such a state that it is penetrated with a torsion coil spring 165. The torsion coil spring 165 abuts against the stopper 164 at one end and against an edge portion of the shaft fitting base 160 at another end, and functions to push the pinch roller 129 against a card 104 and the like.

Number 166 in the figure indicates a transport guide.

The operation of an oscillating mechanism of such a pinch roller will now be described.

When the ticket 104 is transported, the pinch roller 129 is pushed against the ticket 104 by the spring force of the torsion coil spring 165. The pinch roller 129 is connected with the stationary shaft 151 through a bearing 152, and friction at the time of rotation is small. Since the pinch roller is pressed by a spring force, however, it is subject to a force in the transport direction. A torque is applied to the oscillating shaft 154, so that it will rotate so as to tilt the stationary shaft 151 and the pinch roller 129 in the transport direction as they are maintained in parallel with the transport surface. The rotating range at this time is determined by the position where the point end portion 154a of the oscillating shaft 154 abuts against the oscillation stopper plate 159. Namely, the tilt angle of the stationary shaft 151 may be adjusted by the fitting position of the oscillation stopper plate 159, and is at 1° to 2° in this case.

When the stationary shaft 151 oscillates to be tilted with the oscillating shaft 154 as the center, the pinch roller 129 rotates with the tilted stationary shaft 151 as the center. Thus, the ticket 104 approaches cross-widthwise to the oscillating shaft 154 side.

Figure 6A:
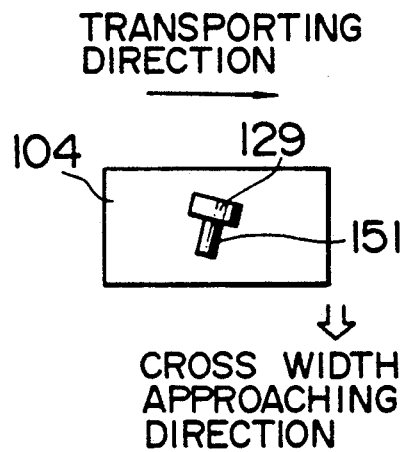
FIGS. 6a and 6b are schematic explanatory views showing the operation of the pinch roller.
Figure 6B:
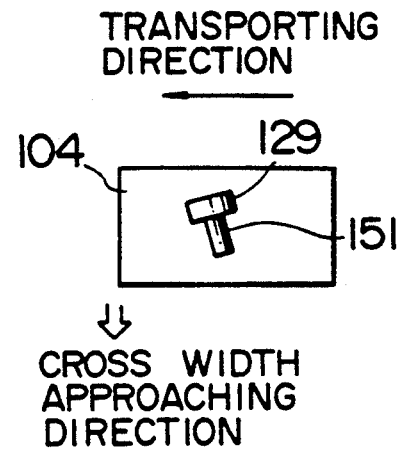
Figure 7:
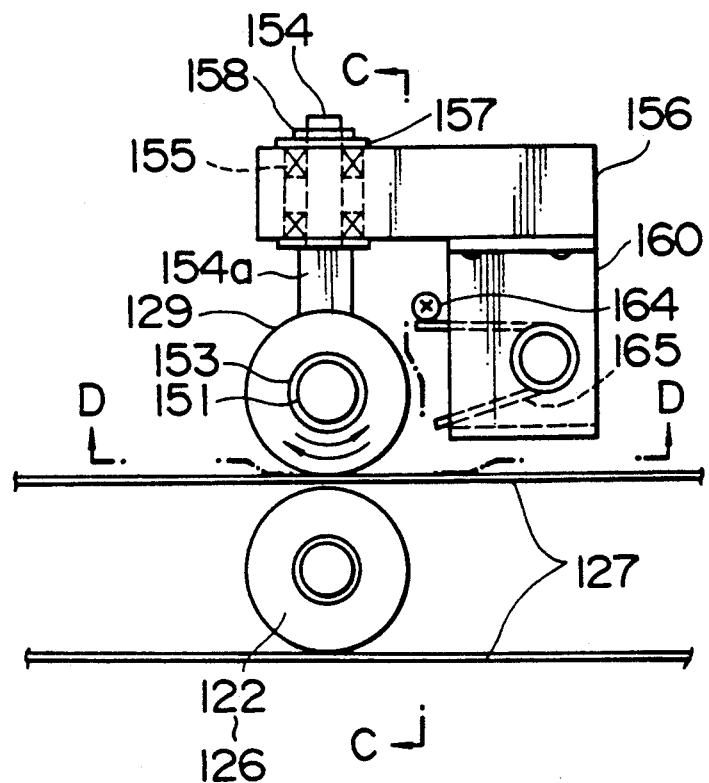
Figure 8:
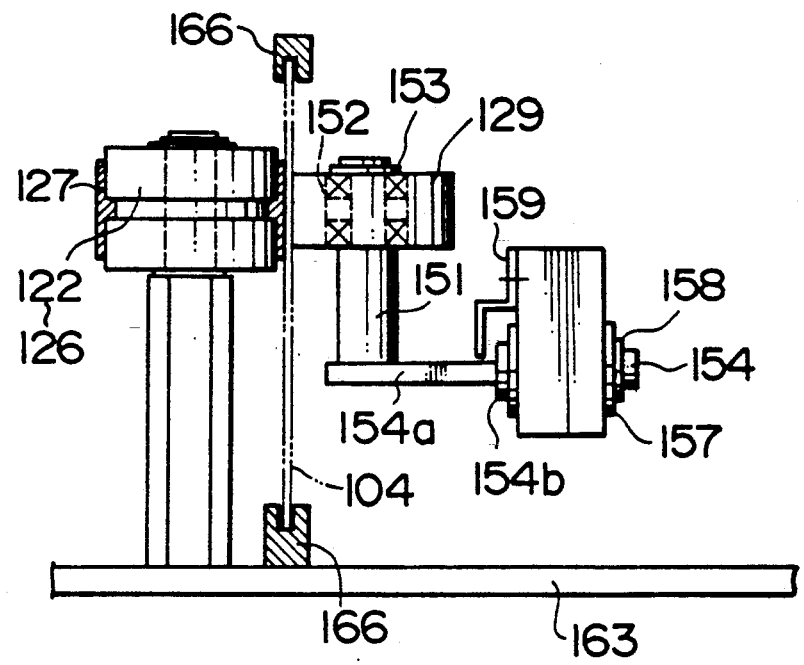
Figure 9:
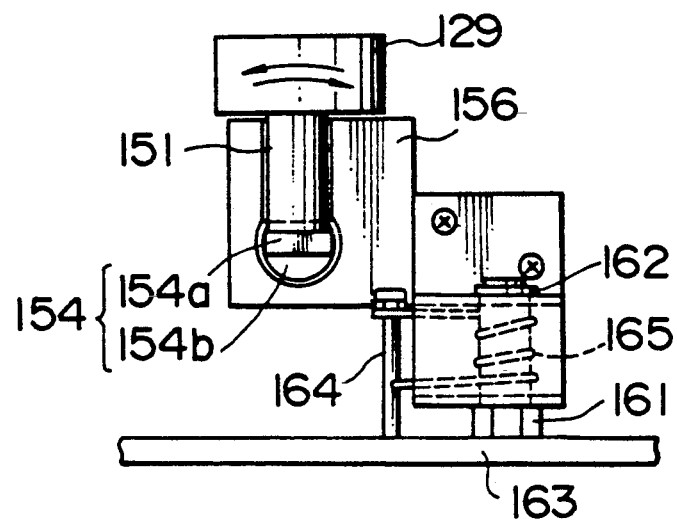

When the ticket 104 is transported in the right direction as shown in FIG. 6 (a), the stationary shaft 151 oscillates clockwise, and the position of the ticket 104 is regulated to the downward side. Further, when the ticket 104 is transported in the left direction in the figure as shown in FIG. 6 (b), the stationary shaft 151 oscillates counterclockwise, and the position of the ticket 104 is also regulated to the downward side.

In such a manner, the position of the ticket 104 is regulated in one direction side (downward side in the embodiment) when it is transported in whichever direction.

Accordingly, the position of the ticket is regulated in one direction regardless of the transport direction when such a pinch roller oscillating mechanism is provided. Thus, it is possible to keep the position in the width direction constant even if the directions of read/write are reversed for instance, which also makes it easy to control the dimension of the cards.

As shown in FIG. 3, a ticket feeding unit 130 which feeds new tickets 104 which are pulled out of a hopper stacker 102 by means of above-described delivery roller 106 to the transport line side between the gateway 101 and the print head 113 is provided at the rear of the hopper stacker 102.

The principal part of the ticket feeding unit 130 is composed of a pair of gripping rollers 131 and 132 located on the delivery roller 106 side, a pair of feed-out rollers 133 and 134 located on the transport line side, a pair of feeding belts 135 and 136 which are wound over these gripping rollers 131 and 132 and feed-out rollers 133 and 134, tension rollers 137a and 137b which are arranged between the gripping rollers 131 and 132 and the feed-out rollers 133 and 134 and remove slackness of these feeding belts 135 and 136, and a pair of new ticket guide plates 138 provided between the feed-out rollers 133 and 134 and the driving roller 121 and the pinch roller 129 abutting thereagainst. Further, the gripping roller 131, the feed-out roller 133 and the tension roller 137a on one side are driven to rotate counterclockwise by actuation of a driving source not shown, and the gripping roller 132, the feedout roller 134 and the tension roller 137b are driven to rotate clockwise in FIG. 3 synchronously with the above-described rotation.

Further, between the delivery roller 106 and the gripping roller are provided, a feed-in roller 139, which is driven to rotate in the same direction as the gripping roller 131 and feeds a new ticket 104 pulled out of the hopper stacker 102 to the gripping rollers 131 and 132 side, and a separating roller 140, which opposes the feed-in roller 139 and is driven to rotate in a reverse direction to the feed-in roller 139 and checks passage of two sheets and more of tickets 104 when plural sheets of tickets 104 are fed in.

Thus, a new ticket 104 which is pushed against the delivery roller 106 by means of the tension spring 112 is sent out between the feed-in roller 139 and the separating roller 140 by the rotation of the delivery roller 106, and only one sheet of ticket 104 is sent out into a gap between the feeding belts 135 and 136 between the gripping rollers 131 and 132 by the action of the separating roller 140 which rotates in the reverse direction. Thus, the ticket 104 is sent out on the transport line between the driving roller 121 and the pinch roller 129 abutting thereagainst from the feed-in rollers 133 and 134 through the new ticket guide plates 138 so that it is put between these feeding belts 135 and 136.

A one-way flapper 141 which regulates the moving direction of the ticket 104 is pivoted in an oscillating manner with respect to the cabinet 103 between these new ticket guide plates 138, the driving roller 121 and the pinch roller 129 abutting thereagainst, and when the ticket 104 is transported from the standby portion 117 side to the gateway 101 side or the hopper stacker 105 side, the one-way flapper is energized upward in FIG. 3 at the point end side thereof through a spring member not shown so that the ticket 104 is not fed from the new ticket guide plates 138 to the ticket feeding unit 130 side.

On the other hand, a change-over flapper 142 which changes over the transport direction of the ticket 104 depending on a case that the ticket 104 is transported from the print head 113 side to the gateway 101 side and a case that the ticket 104 travelling in the hopper stacker 102 is withdrawn is pivoted in an oscillating manner to the cabinet 103 halfway on the transport line between the driving rollers 119 and 120, and this change-over flapper 142 is made to oscillate by flapper driving means such as a rotary solenoid not shown.

The operation timing of above-described delivery roller 106 and lead-in roller 107, printing unit 114, driving rollers 118 to 126, ticket feeding unit 130, flapper driving means and the like is controlled by the processing control portion 3 incorporated in the rear of the main body 2. For such a purpose, optical sensors 143 to 149 which detect passage of the ticket 104 are arranged halfway on the transport line, between the feedout rollers 133 and 134 of the ticket feeding unit 130 and the one-way flapper 141, between the hopper stacker 102 and the change-over flapper 142 and so on, respectively, so as to output a detection signal to the processing control portion 3.

Figure 10:
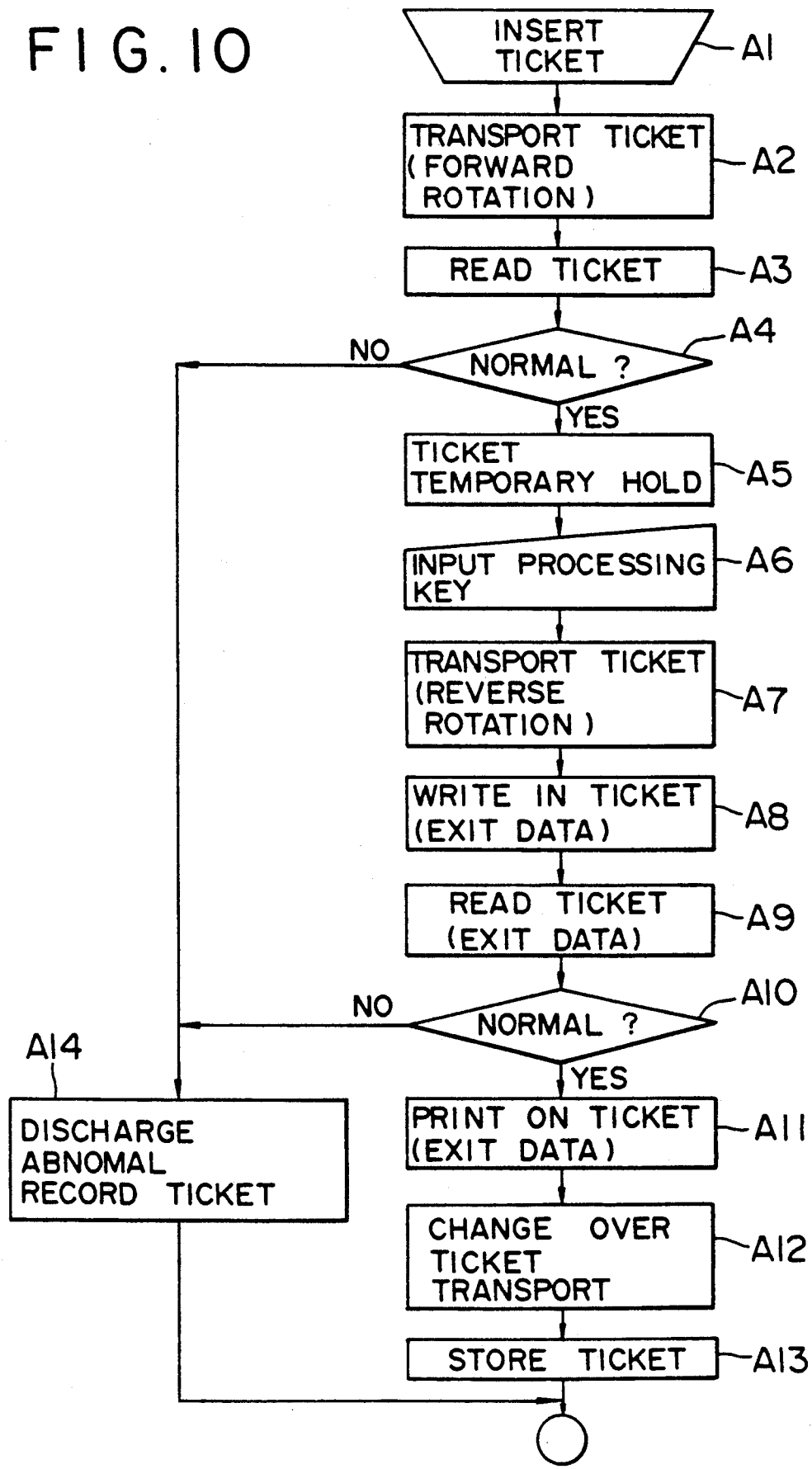

As shown in FIG. 10, which indicates a flow of processing with the ticket processing portion 100, when an operator receives the ticket 104 from a road user who is a customer at a check barrier, an exit gate and the like and inserts the ticket 104 into the gateway 101 in a step A1, the optical sensor 143 detects it, and the pulse motor rotates forwardly in a step A2. As a result, the ticket 104 starts to move toward the standby portion 117 side along the transport line. When the optical sensor 144 detects passage of the ticket 104, the reproducing head 115 reads information recorded in the ticket 104 in a step A3, and it is judged whether the recorded information of the ticket 104 is normal or not in a step A4.

In case the recorded information of the ticket 104 is judged to be normal in the step A4, the pulse motor is stopped to be driven after a certain period of time after transport is continued as it is and the optical sensor 145 detects passage of the ticket 104, and the ticket 104 is made to stand by temporarily at the standby portion 117 in a step A5.

During the temporary standby period, liquidation processing of the toll displayed on the display panel 6 of the operation display portion 1 is performed by using various processing buttons not shown, the ten-key 4 and the like in a step A6. For example, when the toll is liquidated with a highway card, a credit card, an IC card and the like instead of toll liquidation in cash, a toll receiver inserts such a card liquidation from a road user into the gateway 201 of the card processing unit 200 so as to have card data read, confirms with the display panel 6 that there is nothing abnormal, and operates abovedescribed operation buttons.

With this, as shown in a step A7, the pulse motor of the ticket processing portion 100 rotates reversely, the ticket 104 is transported from the standby portion 117 toward the recording head 116, and the recording head 116 records the toll of utilization, the date and hour of utilization, or information related to an exit date and liquidation means, and data recorded in a card in case of liquidation with a card in the ticket 104 as shown in a step A8 at the time when the ticket 104 is detected by the optical sensor 146. Further, the recorded data are read with the reproducing head 115 in a step A9 so as to judge whether there is a something wrong in the recorded information in a step A10.

When it is judged that there is nothing abnormal in the data recorded in the step A10, necessary recorded data are printed at a predetermined location of the ticket 104 by the print head 113 in a step A11, the change-over flapper 142 is swung to the hopper stacker 102 side in a step A12, and the ticket 104 is withdrawn into the hopper stacker 102 in a step A13. At this time, the pulse motor is stopped to be actuated after confirming passage of the ticket 104 with the optical sensor 147.

When it is judged that there is something abnormal in the record in the ticket 104 in the steps A4 or A10, the ticket 104 is not withdrawn into the hopper stacker 102, but the change-over flapper 142 is swung to the gateway 101 side in a step A14, thus returning the ticket 104 to the gateway 101. At this time, the pulse motor is stopped to be actuated after confirming passage of the ticket 104 with the optical sensor 148.

In case of an insertion mistake of the ticket 104, it is only required to insert the ticket 104 returned through the gateway 101 correctly again through the gateway 101. In case of the above-described abnormal record, however, processing such as issuance of a new ticket 104 is performed by means of processing buttons displayed on the display panel 6. Such an operation is similar to that required in case of damage, loss and the like of the ticket 104. Furthermore, the above-described special processing is also performed in case of invalidity and the like of various cards.

As described above, in the present invention, the standby portion 117 for having the ticket 104 stand by temporarily is provided in the ticket processing portion 100. Accordingly, it is not required to give consideration to the order of processing procedures of the ticket 104 and other cards at all, thus presenting excellent workability.

The ticket processing portion 100 has been described as a ticket identifying machine in the present embodiment, but the processing flow in case the ticket processing portion 100 is adopted as a ticket vending machine is shown in FIG. 11. First, a power supply is put ON as initial operation in a step B1, and operation buttons for starting operation which appear on the display panel 6 of the operation display portion 1 are pushed in a step B2. With this, as shown in a step B3, the pulse motor rotates forwardly and the delivery roller 106 and the ticket feeding unit 130 are actuated thereby to extract one sheet of ticket 104 out of the hopper stacker 102, and the ticket 104 is sent out to the reproducing head 115 side. Then, when passage of the ticket 104 is detected by the optical sensors 149 and 144, the reproducing head 115 reads the magnetic information in the ticket 104 in a step B4, and it is judged whether the ticket 104 is a new ticket or not or whether inside and outside thereof are correct or not based on the above in a step B5.

When it is judged that the ticket 104 is correct in the step B5, the ticket is continued to be transported as it is, the pulse motor is stopped to be actuated after detecting passage of the ticket 104 with the optical sensor 145, and the ticket 104 is made to stand by temporarily at the standby portion 117 as shown in a step B6. Such a standby state continues until a pushbutton not shown for selecting a car type is operated.

Then, when an operator operates the pushbutton for selecting a car type in a step B7, the pulse motor rotates reversely in a step B8, the ticket 104 starts to move from the standby portion 117 to the recording head 116 side, and information such as the car type, the date and hour or an entrance gate and the like is written in the ticket 104 by the recording head 116 in a step B9 when passage of the ticket 104 is detected with the optical sensor 146. Then, this recorded information is read by the reproducing head 115 in a step B10, and it is judged whether recording has been performed correctly or not in a step B11.

When it is judged that the record on the ticket 104 is normal in a step B11, necessary information is printed on the ticket 104 by means of the print head 113 in a step B12, and the ticket is sent out to the gateway 101 as it is as shown in a step B13. At this time, the pulse motor is stopped to be actuated after detecting passage of the ticket 104 with the optical sensor 148.

The ticket 104 which has been sent out to the gateway 101 is handed over to a road user by an operator in a step B14. When it is detected by the optical sensor 143 that the ticket 104 has been extracted through the gateway 101, the pulse motor rotates forwardly again, and the delivery roller 106 and the ticket feeding unit 130 are actuated so as to extract one sheet of ticket 104 out of the hopper stacker 102 and send it to the reproducing head 115 side in a step B15. Then, passage of the ticket 104 is detected by the optical sensors 149 and 144, the reproducing head 115 reads magnetic information of the ticket 104 in a step B16, and it is judged based on the above whether the ticket 104 is a new ticket or not or whether inside and outside thereof are correct or not in a step B17.

When it is judged that the ticket 104 is normal in the step B17, the ticket is continued to be transported as it is, the pulse motor is stopped to be actuated after passage of the ticket 104 is detected by the optical sensor 145, and the ticket 104 is made to stand by temporarily at the standby portion 117 as shown in a step B18, then returning to the step B7.

When it is noticed that there is something abnormal in the ticket 104 in any of above-described steps B5, B11 and B17, the process is shifted to a step B19 where judgement is made to be abnormal record, the change-over flapper 142 is changed over to the hopper stacker 102 side in a step B20, and the abnormal ticket 104 is withdrawn into the hopper stacker 102 in a step B21, but the process returns to the step B3 after the optical sensor 147 detects passage of this abnormal ticket 104.

As described above, according to the present invention, it is possible to issue a ticket 104 in a very short period of time after operating a pushbutton for selecting a car type by having a normal ticket 104 stand by temporarily at the standby portion 117 in advance.

Incidentally, the processing mode of the ticket processing portion 100 is any for an entrance gate, an exit gate, a check barrier and a succeeding ticket issuing gate, and the change-over of these processing modes is achieved by a command to the processing control portion 3 from the operation display portion 1.

In above-described ticket feeding unit 130, one belt 135 is wound over a feed-in roller 139, gripping rollers 131, 132, a feed-out roller 133 and a tension roller 137a, another belt 136 is wound over a gripping roller 132, feed-out rollers 133 and 134 and a tension roller 137b, both belts 135 and 136 are put one upon another between the gripping roller 132 and the feed-out roller 133, and the ticket 104 is put between these belts 135 and 136 and transported to a new ticket guide plate 138. However, the ticket feeding unit 130 may also be constructed as shown in FIG. 12. In a ticket feeding unit 130' shown in FIG. 12, one belt 135' is wound over a feed-in roller 139, gripping rollers 131 and 132, a tension roller 137d, a feed-out roller 133 and tension rollers 137c and 137a, and another belt 136' is wound over a gripping roller 132a and a feed-out roller 134, both belts 135' and 136' are put one upon another between the tension roller 137d and the feed-out roller 133, and the ticket 104 is put between these belts 135' and 136' and transported up to the guide plate 138.

Figure 13:
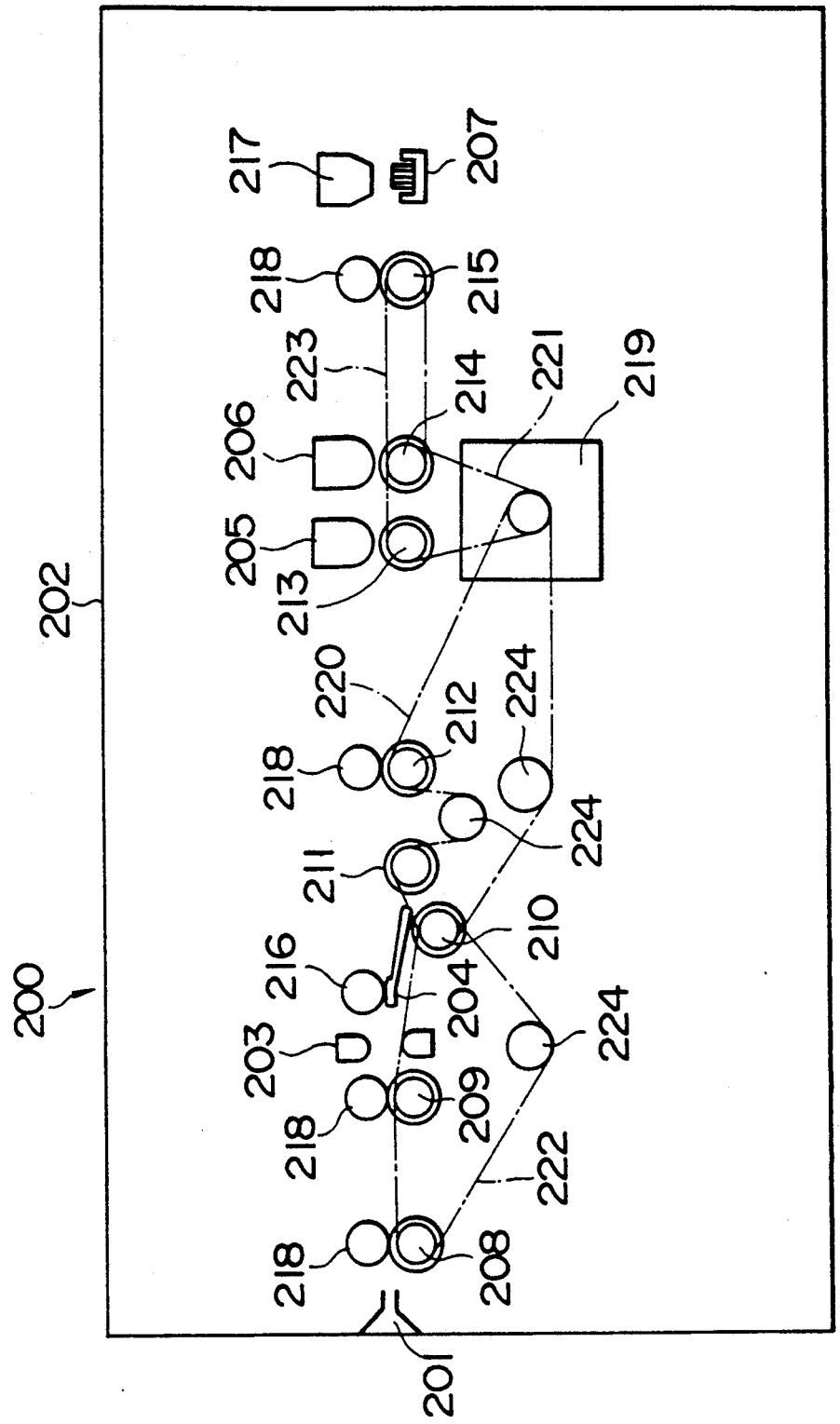
Figure 14:
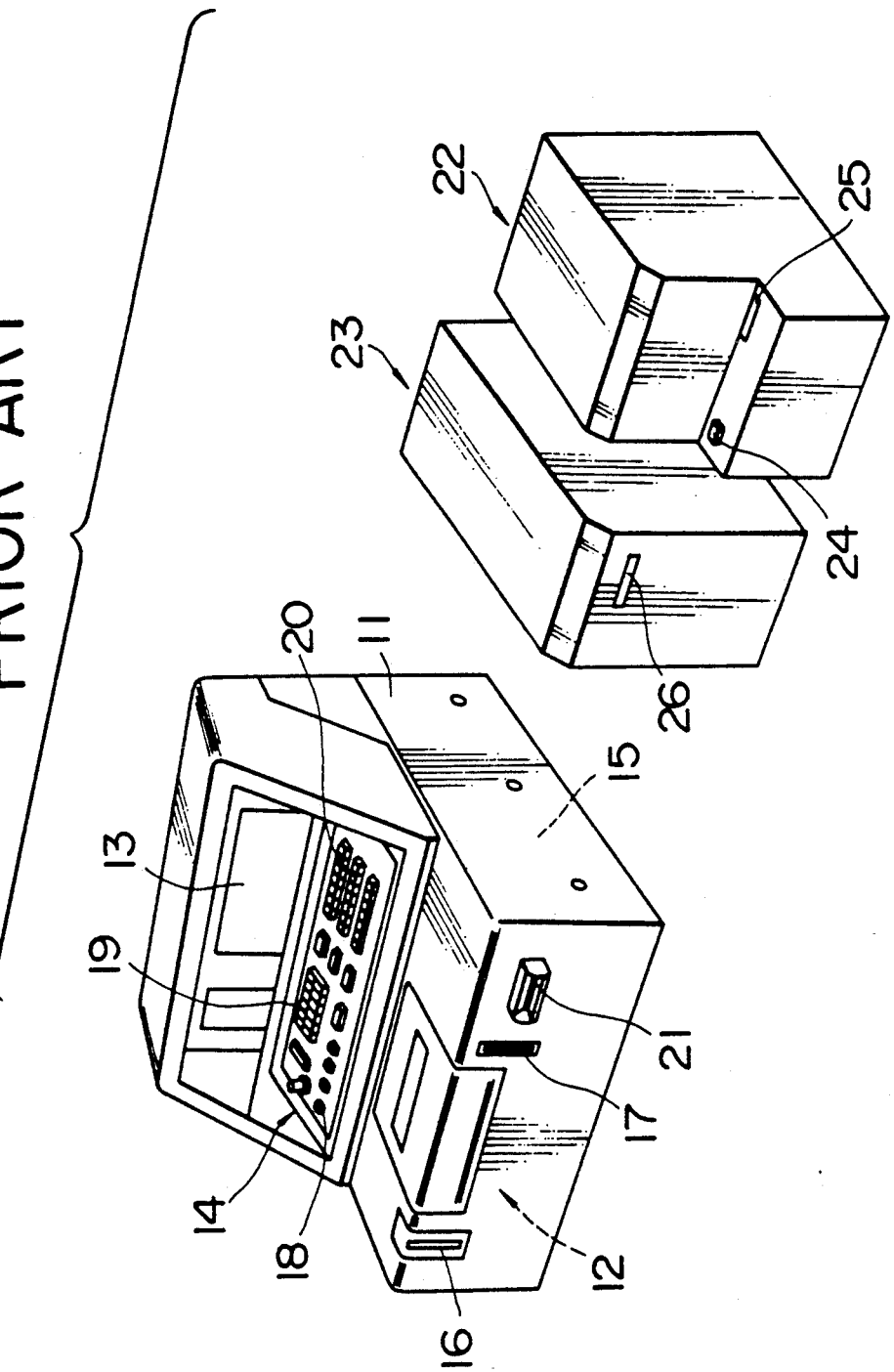
FIG. 14 is a perspective view of a conventional ticket identifying machine.
Figure 15:
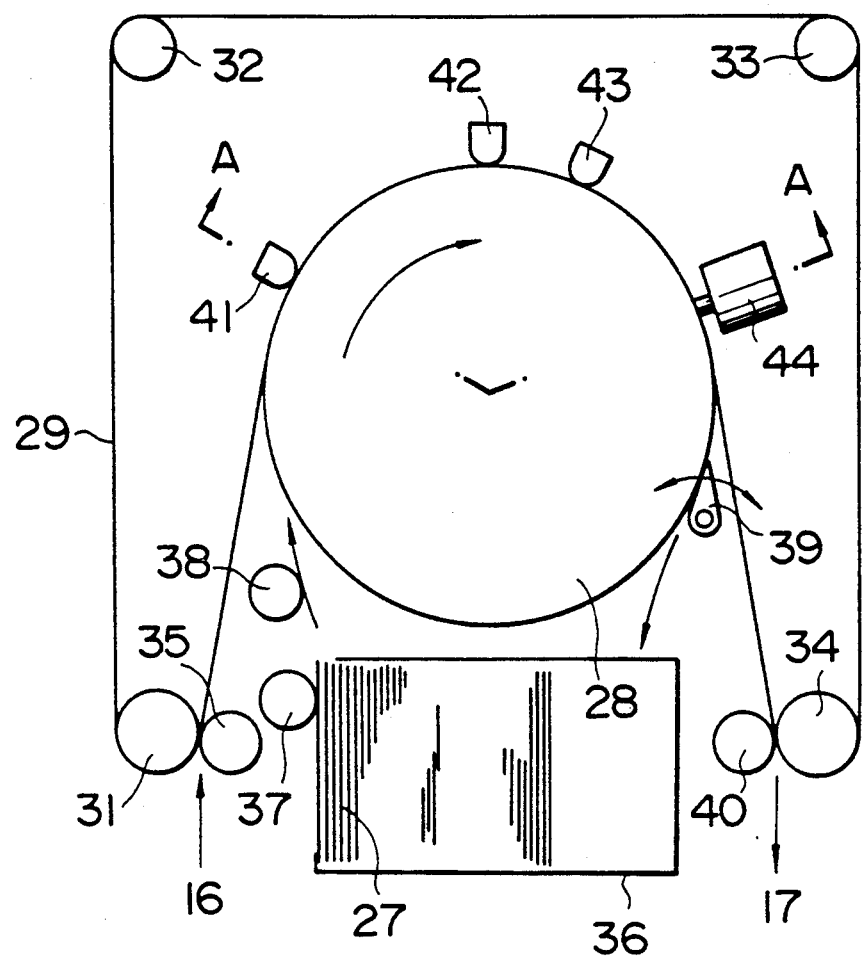
FIG. 15 is a schematic view of a mechanism showing a structure of the ticket processing portion of the machine of FIG. 14.
Figure 16:
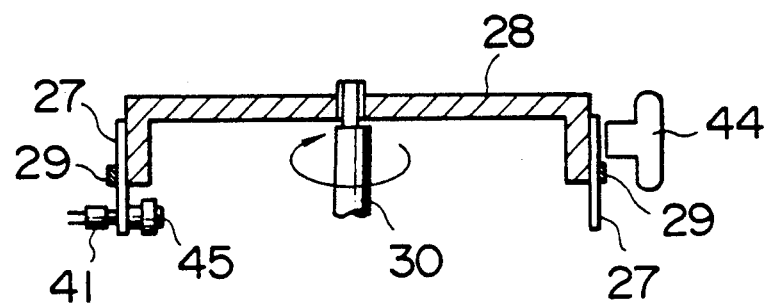
FIG. 16 is a schematic cross sectional view taken along line A—A of FIG. 15.

FIG. 13 shows a schematic structure of the card processing unit 200. This card processing unit 200 processes various cards such as a highway card which is a prepaid card other than above-described ticket 104, a separately paid plate which is a credit card, or an IC card collectively.

In this card processing unit 200, a transport line is formed in a straight line from the gateway 210 to the rear end of a cabinet 202. In the cabinet 202, there are provided a card type sensor 203 for detecting a type of the card in consecutive order from the gateway 201 along the transport line, a thermosensible print head 204 for recording necessary information in a printable card such as a highway card, a reproducing head 205 for reading magnetic information of a magnetic recording portion not shown formed in a card such as a credit card, a recording head 206 for writing new magnetic information into this magnetic recording portion, and a read electrode 207 for reading information recorded in a card such as an IC card.

A plurality of driving rollers 208 to 215 which have a card reciprocate along the transport line are fitted to the cabinet 202 rotatably at intervals shorter than the length of a card. A presser roller 216 abuts against the thermosensible print head 204, and the driving rollers 213 and 214 oppose the reproducing head 205 and the recording head 206 across the transport line, respectively. On the other hand, a retainer 217 which opposes to the read electrode 207 across the transport line is disposed therein. Further, pinch rollers 218 fitted to the cabinet 202 across the transport line, respectively, abut against driving rollers 208 and 209 located between the gateway 201 and the thermosensible print head 204 and driving rollers 212 and 215 located on both sides of the driving rollers 213 and 214 as shown in FIG. 13.

Respective driving rollers 208 to 215 are driven to rotate synchronously through timing belts 220 to 222, respectively, by means of a pulse motor which is installed below the reproducing head 205 and the recording head 206 and is able to rotate reciprocably, and actuation of these pulse motor 219, thermosensible print head 204, reproducing head 205, recording head 206, read electrode 207 and the like is controlled by the processing control portion 3 based on the detection signal from the card type sensor 203 and the like.

Besides, a numeral 224 in the figure indicates a tension roller.

Accordingly, when an operator inserts a card received from a road user into the gateway 201 at the time of liquidation, the pulse motor 219 rotates forwardly so as to pull in the card into the cabinet 202. In case the card type sensor 203 detects the card as a highway card, the present balance is read with the reproducing head 205 and outputted to the processing control portion 3 incorporated in the main body 2. Thereafter, the toll of utilization this time is liquidated, and the balance and the like are written in the highway card with the recording head 206. Then, the pulse motor 219 rotates reversely so as to send out the highway card to the gateway 201, and on the way, above-described processing is confirmed with the reproducing head 205 as occasion demands, and above-described balance and the like are also printed with the thermosensible print head 204.

When the card type sensor 203 detects that the card is a credit card such as a separately paid plate, information recorded in this credit card is read with the reproducing head 205 and outputted to the processing control portion 3. Thereafter, the pulse motor rotates reversely so as to send out this highway card to the gateway 201. Further, in case of an IC card, the IC card is transported up to the read electrode 207 and information recorded therein is read and outputted to the processing control portion 3. Thereafter, the pulse motor 219 rotates reversely so as to send out the IC card to the gateway 201.

We claim:

1. A cards processor on terminal equipment for a toll road receiver or the like system comprising:
    a gateway on one end side of a cabinet forming part of said equipment and through which used cards are inserted and used and new cards are discharged;
    a standby portion on another end side of said cabinet for maintaining said cards in a standby condition temporarily;
    a hopper stacker on said one end side of said cabinet for storing said cards;
    transport means operatively mounted in said cabinet for moving said cards reciprocatingly in transport directions along a transport line connecting said standby portion with said gateway;
    reproducing and recording means disposed between said gateway and said standby portion on said transport line for reading and writing information on said cards;
    a change-over flapper mounted in said cabinet on said transport line between said gateway and said reproducing and recording means movable between a first position and a second position for guiding said cards transported from said standby portion toward said gateway when in said first position and toward said hopper stacker when in said second position; and
    feed-out means for feeding new cards stored in said hopper stacker individually onto said transport line at a position between said gateway and said reproducing and recording means.

2. A cards processor as claimed in claim 1, wherein said transport means comprises:
    a plurality of driving rollers mounted in spaced relationship along said transport line at intervals shorter than the length of said cards;
    an endless belt having inner and outer surfaces and extending over said driving rollers for engagement on said inner surface thereof with said driving rollers so that said driving rollers drive said belt;
    a plurality of pinch rollers mounted in spaced relationship along said transport line in pressure contact with said outer surface of said belt for urging said belt against at least some of said driving rollers
    transport guides for engaging and guiding opposite edges of said card and disposed along said transport line in a position relative to said belt and said pinch rollers so that said cards pass between said pinch rollers and said outer surface of said belt;
    a shaft for each pinch roller; and
    means for mounting each pinch roller shaft in said cabinet so that each shaft and the axis of rotation of the respective pinch roller may oscillate within a range of a fixed angle with respect to a line perpendicular to the plane of said card moving in said transport directions for urging said card in the direction of one of said edges during movement of said card.

3. A cards processor as claimed in claim 2, wherein said transport means further comprises:
    means associated with each pinch roller for resiliently urging said pinch rollers into said pressure contact with said outer surface of said belt.

* * * * *